UNITED STATES PATENT OFFICE.

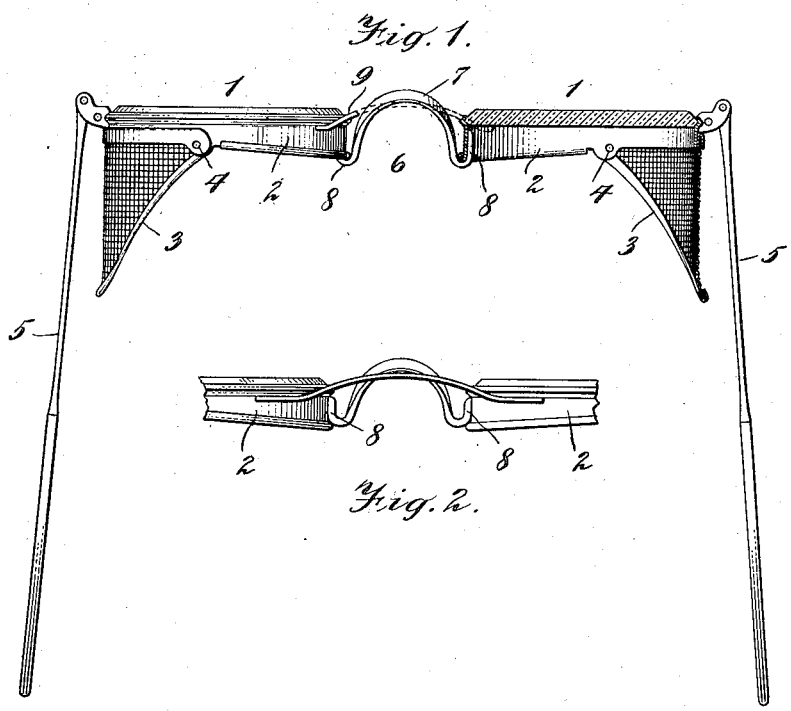

WALTER G. KING, OF NEW YORK, N. Y.

GOGGLES.

1,137,494.

Specification of Letters Patent.  Patented Apr. 27, 1915.

Application filed May 13, 1914. Serial No. 838,215.

*To all whom it may concern:*

Be it known that I, WALTER G. KING, a citizen of the United States, residing at the city of New York, in the borough of Manhattan and State of New York, have invented certain new and useful Improvements in Goggles, of which the following is a full, clear, and exact description.

This invention relates to goggles, the object being to provide a way of utilizing the well known and popular style of nose bridge known as the "saddle" bridge, without producing the wide pupilary distance which ordinarily accompanies the use of the "saddle" bridge.

A further object of the invention is to provide a way of attaching the bridge to the lens rims in goggles which will furnish a very strong and rigid structure.

The well known "saddle" bridge consists of an arch-shaped member accurately fitting and adapted to rest upon, the bridge of the nose, and having its extremities reversed or looped so as to form forwardly-extending arms which are attached to the outside of the lens rims. Such a bridge when interposed between the lens rims, separates the latter a considerable distance and spaces each of the rims from the sides of the nose a distance equal to the distance between the extremity of the bridge and the arched portion. The rims, therefore, encroach upon the eye and do not hug the sides of the nose closely so that the range or angle of vision is more or less obstructed and the pupils of the eyes are not directly opposite the centers of the lenses. My improved attachment between the bridge and the lens rims consists in securing the reversed extremities of the bridge to the inner surfaces of the respective rims. In this way the rims occupy the spaces between the extremities and the arched portion of the bridge and are thus nearer together and nearer to the sides of the nose so that the pupilary distance of the goggle is reduced.

My invention will be described in detail in connection with the accompanying drawing, wherein—

Figure 1 is a plan of one form of goggle to which my invention is applied, a portion being shown in section; and Fig. 2 is a plan of a portion of a pair of goggles showing a bridge of the same character as illustrated in Fig. 1, but attached to the rims according to the plan generally in use prior to my invention.

The goggle consists essentially of the two lenses 1—1, which may be of plain glass or glass having focal power, as desired. These lenses are set in the forward edges of cup-shaped rims 2, such rims having considerable depth so as to protect the eyes from foreign matters entering around the edges of the lenses. The goggles as shown are also equipped with temple guards 3—3 consisting of wire gauze set in suitable curved frames which are pivoted at 4—4 to the lens rims and are adapted to be folded inward for compactness when the goggle is not in use. To the outer extremities of the rims are pivotally attached the temples 5, which, in this case, are adapted to be folded forward when not in use, against the front faces of the lenses.

6 indicates the well known "saddle" nose bridge comprising the arched portion 7 shaped as to spread, curvature and inclination to fit snugly upon the bony structure at the base of the nose and hold the lenses at such a distance from the eyes as not to interfere with the eyelashes. The extremities of the arched portion 7 of the bridge are reversed so as to form a loop at each end of the bridge, such extremities being indicated by 8—8. These extremities 8 are attached to the respective rims by passing the rims into the space between the sides of the arch 7 and the extremities 8, thus bringing the latter inside of the rims, and then securing the said extremities by means of solder or otherwise, firmly against the inner surfaces of the rims. For additional rigidity, a brace 9 may be spanned across from one rim to the other above the bridge with its extremities soldered to the exterior of the rims, but this brace is not a feature of my invention. It will be seen that by placing the lens rims inside of the loops at the ends of the bridge, the rims are brought nearer together than they are when the extensions 8 are secured to the outer surfaces of the rims. This latter construction is shown in Fig. 2 and is the construction heretofore in vogue. The extensions or extremities 8 are then secured directly to the outer surfaces of the rims 2, and by comparing Fig. 2 with Fig. 1, in which the dimensions of all the parts agree, it will be seen that the distance between the lens rims of Fig. 2 is much greater than it is between the lens rims of Fig. 1. Or, in other words, that the pupilary distance of the goggles constructed as in Fig. 1 is less than that of the goggles constructed as in Fig. 2.

When the goggles of Fig. 1 are placed upon the nose, the inner portions of the lens rims are as near to the sides of the nose as they can be brought, whereas, when the goggles of Fig. 2 are used, the lens rims are somewhat remote from the sides of the nose. Thus, in using the new goggle of Fig. 1, vision to the right and left will be obtained through a wider angle than will be possible when the goggle of Fig. 2 is used, since the inner edges of the rims are more remote from the pupils of the eyes in the construction of Fig. 1 than they are in the construction of Fig. 2. The ability to obtain this short pupilary distance and still use the "saddle" bridge is of particular importance when the lenses or glasses have focal power, for then it is more essential to have the pupilary distance of the goggle accurately fit that of the eyes so that the vision forward will pierce the centers of the lenses where least aberration takes place. When the reversed extremities of the "saddle" bridge are attached to the inside of the rims, a more rigid connection is obtained than when they are attached to the outside of the rims, the edges of the rims being seated against the bottom of the loops of the bridge.

I claim:—

1. A goggle comprising lens rims of greater width than the thickness of the lenses, and extending rearward from the plane of the lens in combination with a nose bridge whose extremities are secured to the inner surfaces of the respective rims.

2. A goggle comprising lens rims of greater width than the thickness of the lenses, and extending rearward from the plane of the lens in combination with a nose bridge whose extremities are secured to the inner surfaces of the respective rims and extend therefrom around the rear edges of the rims and forward therefrom.

In witness whereof, I subscribe my signature, in the presence of two witnesses.

WALTER G. KING.

Witnesses:
 JULIUS KING,
 GEO. WORMSER.